United States Patent [19]

Southwick et al.

[11] Patent Number: 4,795,575

[45] Date of Patent: Jan. 3, 1989

[54] STABILIZING POLYMER-THICKENED AQUEOUS ALKALINE SOLUTIONS WITH A MERCAPTOBENZOTHIAZOLE

[75] Inventors: Jeffrey G. Southwick, Lexington, Mass.; Richard C. Nelson, Houston, Tex.

[73] Assignee: Shell Oil Company, Houston, Tex.

[21] Appl. No.: 75,381

[22] Filed: Jul. 20, 1987

Related U.S. Application Data

[63] Continuation-in-part of Ser. No. 861,372, May 9, 1986, abandoned, which is a continuation-in-part of Ser. No. 673,080, Nov. 19, 1984, abandoned.

[51] Int. Cl.$^4$ .............................................. E21B 43/22
[52] U.S. Cl. .................. 252/8.554; 166/270; 166/275; 524/83
[58] Field of Search ..................... 252/8.554; 166/270, 166/275; 524/83

[56] References Cited

U.S. PATENT DOCUMENTS

| | | | |
|---|---|---|---|
| 3,343,601 | 9/1967 | Pye | 166/275 |
| 3,977,470 | 8/1976 | Chang | 166/274 X |
| 4,218,327 | 8/1980 | Wellington | 252/8.554 |
| 4,317,758 | 3/1982 | Bruning | 524/202 |
| 4,317,759 | 3/1982 | Kanda et al. | 524/93 |
| 4,486,340 | 12/1984 | Glass | 252/8.51 X |
| 4,502,541 | 3/1985 | Lawson et al. | 252/8.554 X |

FOREIGN PATENT DOCUMENTS

| | | | |
|---|---|---|---|
| 1142336 | 3/1983 | Canada | 252/8.554 |
| 4927659 | 7/1974 | Japan | 524/83 |

OTHER PUBLICATIONS

Ryles, "Chemical Stability Limits of Water Soluble Polymer used in Oil Recovery Processes", SPE Paper No. 13585, 1985, presented at the International Symposium on Oilfield and Geothermal Chemistry held in Phoenix, AZ, Apr. 9–11.

*Primary Examiner*—Herbert B. Guynn

[57] ABSTRACT

An oil recovery process in which oil is displaced by a viscous alkaline aqueous solution is improved by using such an aqueous alkaline solution containing a water-thickening polymer partially hydrolyzed polyacrylamide polymer and a stabilizer consisting essentially of a 2-mercaptobenzothiazole in the presence of a sulfur-containing oxygen scavenger. A readily oxidizable alcohol or glycol may also be included.

17 Claims, 3 Drawing Sheets

STABILIZING POLYMER-THICKENED AQUEOUS ALKALINE SOLUTIONS WITH A MERCAPTOBENZOTHIAZOLE

RELATED APPLICATION

This application is a continuation-in-part of our application Ser. No. 861,372, filed May 9, 1986, now abandoned, which was a continuation in part of our application Ser. No. 673,080, filed Nov. 19, 1984, now abandoned.

BACKGROUND OF THE INVENTION

The present invention relates to an oil recovery process in which an aqueous alkaline solution containing a water-soluble polymer for reducing the mobility of the solution is injected into a subterranean reservoir to displace oil within the reservoir to a production location. More particularly, the invention relates to such a process in which the aqueous alkaline solution has been substantially freed of dissolved oxygen and is thickened with a partially hydrolyzed polyacrylamide polymer.

With respect to fluid drive oil recovery processes, it is known to use water-soluble anionic polymers as mobility reducing agents. For example, U.S. Pat. No. 3,208,518 suggests using such a solution with an initial pH which reduces the solution viscosity during injection and then rises to increase the solution viscosity within the reservoir. U.S. Pat. No. 3,343,601 suggests that polymer-thickened floor water be deoxygenated by adding a water-soluble hydrosulfite before or after adding the polymer. U.S. Pat. No. 3,581,824 suggests that, within a reservoir, a polymer solution be contacted with an aqueous solution containing divalent cations to agglomerate the polymer, for selectively plugging portions of the reservoir. U.S. Pat. No. 3,676,494 describes sulfur-containing aromatic carboxylic acid amides and indicates that they can stabilize oxygen-sensitive organic materials against oxidation. U.S. Pat. No. 3,801,502 suggests that the viscosity increasing capability of xanthan gum polymers be increased by adding various materials inclusive of water-soluble alcohols.

U.S. Pat. No. 4,317,759 discloses that a combination of a phenolic antioxidant and a mercaptobenzimidazole can stabilize an aqueous polyacrylamide polymer solution. Japanese Pat. No. Sho 49[1974]-27659 relates to stabilizing certain acrylamide polymers for certain uses, such as an aggregation agent, in which the desired effect is higher in the case of higher-molecular-weight polymers (e.g. molecular weights of at least 700,000 or more). The patent is specifically directed to treating polymers in which no more than 50 mole percent of amido groups within a homopolymer may be converted to other functional groups, such as acrylate groups formed by means of chemical reactions such as alkaline hydrolysis. The specified stabilization is said to be accomplished by adding at least one type of 2-mercaptobenzothiazole or its water-soluble salt to the polymer.

In an oil recovery process in which oil is displaced within a subterranean reservoir by injecting a polyacrylamide-polymer-thickened aqueous alkaline solution, relatively unique problems are created by factors such as the solution alkalinity, the reservoir temperature, the duration of the operations, etc. Such problems are discussed in SPE Paper No. 13585, "Chemical Stability Limits of Water Soluble Polymer Used in Oil Recovery Processes" by R. G. Ryles. As indicated in the paper, the commercially available polyacrylamide polymers are typified by initial mole percentage concentrations of acrylate groups in the order of 26 to 30 percent, due to copolymerization or hydrolysis of acrylamide groups, with the polymers having molecular weights in the order of 7 to 14 million. Hydrolysis occurs when water reacts with amide linkages in the polymer. Based on anaerobic stability tests for defining the stability limits of such polyacrylamide polymers in alkaline aqueous solutions, it was found that, even in reservoirs with temperatures as low as 50° C. (122° F.), the mole proportion of the acrylate groups would be greater than 50 percent within less than about two weeks, due to hydrolysis occurring in the reservoir. Although in the presence of a neutral solution with free hardness ions, this hydrolysis may cause the polymer solution to lose viscosity and become less effective, in the presence of an alkaline solution, the hydrolysis provides a beneficial effect by increasing the viscosity of the polymer solution.

The chemical composition of water-soluble polyacrylamide polymers which are effective as water-thickening agents for aqueous alkaline solutions is such that the polymers are susceptible to chemical degradation. Such a degradation, which increases with increasing temperature, reduces the viscosity of a solution containing the polymers. The typical cause of such a degradation is a free-radical reaction. Free-radical reactions are usually those initiated when the polymer solution is mixed with air or oxygen. Such an oxygen-containing mixture tends to form hydroperoxides, and it is the decomposition of the hydroperoxides to peroxide radicals that initiate polymer degradation.

SUMMARY OF THE INVENTION

The present invention relates to an oil recovery process in which oil is displaced within a subterranean reservoir by injecting an aqueous alkaline solution that is substantially free of dissolved oxygen, has a pH above about 10, and is thickened with a partially hydrolyzed polyacrylamide having molecular weight exceeding about 5 million, where said polymer, at least soon after entering the reservoir, contains significantly more than about 50 mole percent of acrylate groups formed by alkaline hydrolysis of amido groups. An improvement is effected by formulating the solution to be injected so that it contains effective amounts of each of a water-soluble sulfur-containing oxygen scavenger and a 2-mercaptobenzothiazole antioxidant or stabilizer of the formula:

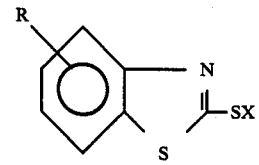

where R represents one or more hydrogen atoms or lower hydrocarbon radicals and X represents a hydrogen atom or other monovalent cation. A readily-oxidizable alcohol or glycol may also be included.

DESCRIPTION OF THE INVENTION

Figure 1:
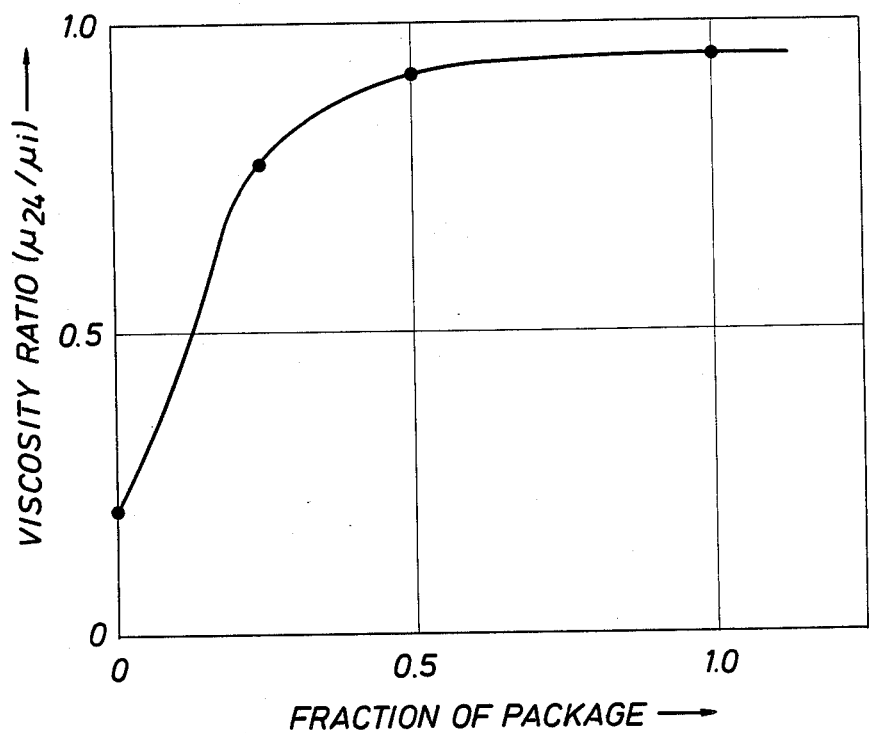
FIG. 1 is a plot of variations with increasing amount of additives in the viscosity of an aqueous alkaline polymer solution.

In general, the aqueous alkaline solution injected into a subterranean reservoir in order to form surface active soaps of petroleum acids contained in the reservoir oil and enhance the recovery of oil has a relatively high pH of about 10 to 13 or more. The alkalinity can be established by including the alkaline materials in solution, such as the alkali metal or ammonium hydroxides, carbonates or silicates, or the like. Where the dissolution of silica is apt to be a problem in a siliceous reservoir, the alkaline solution can advantageously contain an amount of soluble silicate particularly suited for the reservoir temperature, for example, as described in U.S. Pat. No. 4,458,755 by J. G. Southwick and R. C. Nelson.

The aqueous liquid used in the present process is an alkaline solution, having a pH above about 10. Such a solution preferably has a total dissolved salt content of not more than about 100,000 ppm and a hardness compatible with the alkalinity of the solution. When deoxygenated for use in the present process, such a water is preferably substantially completely free of dissolved oxygen and its total dissolved salt content preferably includes from about 100 to 500 parts per million $SO_3$ group-containing oxygen scavenger (in terms of $SO_3$ group equivalent).

Numerous types of materials and techniques for treating aqueous solutions to remove dissolved oxygen are known to those skilled in the art. Water-soluble inorganic compounds that contain or form ions having an $SO_3$ group are particularly suitable oxygen-scavengers for use in the present oil recovery process. Such compounds include water-soluble alkali metal sulfites, bisulfites, dithionites, etc. As known to those skilled in the art, such an oxygen scavenger is preferably used in a stoichiometric excess, relative to the amount needed to remove substantially all of the dissolved oxygen in the solution being treated. Such an excess is preferably from about 10 to 500% more than stoichiometric. The stoichiometric excess in the present process depends upon the total amount of oxygen in the make-up brine, and the amount of oxygen which contacts the solution during mixing and injection into the reservoir. In the alkaline solution of the present invention, the oxygen-scavenger is preferably an alkali metal dithionite.

As known to those skilled in the art, in an oil recovery process in which fluids are displaced within a subterranean reservoir by injecting a viscosity-enhanced aqueous solution, the effective viscosity (or reciprocal mobility within the reservoir) should be at least substantially equal to and preferably greater than that of the fluid to be displaced. In the present process, the concentration of polyacrylamide polymer in the injected solution should be in the order of about 500 to 3,000 parts by weight of the polymer per million parts by weight of aqueous liquid. Such concentrations are generally capable of providing viscosities in the order of from about 4 to 50 centipoises at room temperature in a water containing about 25,000 parts per million total dissolved solids.

It is known that a rigorous exclusion of oxygen from a polymer solution can stabilize the solutions at relatively high temperatures. Polymer-stabilizing materials usually comprise additives which function as oxygen scavengers or antioxidants, but most of those materials which are useful in neutral solutions, such as formaldehyde or thiourea, are chemically unstable in alkaline solutions.

Water-soluble anionic polymers suitable for use in the present invention include essentially linear high molecular weight polyacrylamide polymers and/or copolymers, which have some or substantially all of the amido groups hydrolyzed to, or replaced by, carboxyl groups. Examples of suitable partially hydrolyzed polyacrylamide polymers have molecular weights exceeding about 5 million and, at least soon after being injected into a reservoir being treated, become polymers containing more than about 50 mole percent carboxyl, or acrylate groups. Examples of particularly suitable polymers include the Pusher polyacrylamide polymers available from Dow Chemical Company, or the Cyanatrol polyacrylamide polymers available from American Cyanamid Company.

The polymer stabilizer, or antioxidant used in the present process comprises substantially a water-soluble 2-mercaptobenzothiazole of the formula:

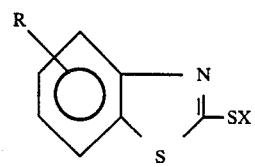

where R represents one or more hydrogen atoms or lower hydrocarbon radicals and X represents a hydrogen atom or other monovalent cation which antioxidant is compatible with and effective in the presence of the other components of the aqueous alkaline solution to be injected. The concentration of the mercaptobenzothiazole antioxidant can be relatively low, on the order of about 50 parts per million by weight, and preferably from about 200 to 800 parts per million.

The alcohols or glycols which may be included in the present process encompass substantially any water-soluble, readily oxidizable alcohol, or glycol. Such compounds are typified by the capability to protect a water-soluble anionic polymer solution from drastic loss of viscosity during overnight storage at 80° C. with 36 ppm hydrogen peroxide at atmospheric pressure. Examples of such compounds include methanol, ethanol, allyl alcohol, isopropyl alcohol, isobutyl alcohol, ethylene glycol, and the like. The readily oxidizable alcohol or glycol concentration can be from about 50 to 5,000 parts per million, and preferably from about 500 to 2,000 parts per million.

Since the degradation of polymers does not occur instantaneously, and is dependent on temperature, a relatively quick, but effective screening procedure to evaluate inhibitor effectiveness has been developed. This comprises adding to polymer-thickened solutions, such as a polyacrylamide polymer solution, chemicals which are capable of immediately forming reactive radicals similar to those which would subsequently be formed from dissolved oxygen. Such chemicals can include hydrogen peroxide, substituted peroxides, or ammonium peroxysulfate, which dissociate in water to produce peroxide radicals. The polymer degradation process is accelerated by providing a relatively high concentration of these free radicals in the solution. The stoichiometric proportions of the inhibitor chemicals, such as the present mercaptobenzothiazoles, are significantly higher, so that a fair test of their inhibitor effectiveness is provided. It was found that meaningful indications of inhibiting capabilities are obtained by determining a ratio comprising the viscosity of the polymer solution after 24 hours divided by the viscosity of the freshly prepared solution.

Typical 24-hour screening tests and the compositions of the tested fluids are presented in Table I. All of the aqueous alkaline polymer solutions used in the tests described herein has a pH of about 13 and contained amounts of polymer providing an initial solution viscosity of about 30 centipoise.

TABLE I

24-HOUR "SCREENING TESTS" OF CHEMICALS TO PROVIDE VISCOUS STABILITY OF POLYMER SOLUTIONS

All samples contained: 1% NaOH
1.5 NaCl
2500 ppm polyacrylamide
120 ppm (0.0005 M) ammonium peroxysulfate
100 ppm sodium dithonite

| Tests | Chemical Additives | Molar Concentration | Viscosity Ratios (Before/After 24 Hrs.) | | |
|---|---|---|---|---|---|
| | | | 50° C. | 70° C. | 80° C. |
| (1) | 800 ppm TEPA (Tetra-ethylenepentamine | .0042 | .50 | .44 | .28 |
| | 500 ppm Allyl Alcohol | .0086 | | | |
| (2) | Like (1) without ammonium peroxysulfate | | | .96 | |
| (3) | 800 ppm TEPA | .0042 | .58 | .54 | .49 |
| | 2000 ppm Allyl Alcohol | .0344 | | | |
| (4) | 800 ppm TEPA | .0042 | .84 | .77 | .63 |
| | 1000 ppm 3-3' Thiodipropionic Acid | .0056 | | | |
| (5) | 800 ppm TEPA | .0042 | .98 | .96 | .91 |
| | 1000 ppm 2-MBI (2-Mercaptobenzimidazole) | .006 | | | |
| | 1600 ppm Methyl Alcohol | .5 | | | |
| (6) | 1500 ppm 2-MBT (2-Mercaptobenzothiazole) | .009 | 1.16 | 1.22 | 1.22 |
| | 40,000 ppm Methyl Alcohol | | | | |

In each of the tests, the solutions were prepared by using an oxygen scavenger (sodium dithionite) along with an antioxidant or free-radical deactivator and a sacrificial agent such as an alcohol or glycol. As indicated by tests 1 and 3, the tetraethylenepentamine (TEPA) and allyl alcohol system was only marginally effective in the alkaline solution containing ammonium peroxysulfate, although TEPA is commonly used as a stabilizer for water-soluble polymers and is available from Union Carbide under the trade name Ucar. The activity of ammonium peroxysulfate in generating free radicals is shown by the fact that when it was absent, in Test 2, the TEPA-containing solution showed good stability at 70° C.

The additive combination of Test 5, including TEPA and 2-mercaptobenzimidazole (2-MBI) is currently prohibitively expensive for use as an inhibitor in an oil recovery process. Test 6 showed the very significant stabilization provided by the 2-mercaptobenzothiazole (2-MBT) stabilizer of the present invention. The mercaptobenzothiazole is a compound widely used in commercial operations, such as rubber vulcanization, and is considerably less expensive than mercaptobenzimidazole. Test 6 used an unnecessarily large proportion of methyl alcohol but resulted in a solution in which the viscosity increased above the initial value. Such an increase in viscosity is common for polyacrylamide solutions which have been stabilized. The increase in viscosity is not caused by the additive but is a result of alkaline hydrolysis of some of the amide group of the polymer.

FIG. 1 shows a plot of viscosity degradation in 24-hours at 80° C. in aqueous alkaline solutions containing 2500 ppm polyacrylamide, 100 ppm sodium dithionite, 1% sodium hydroxide and 1.5% sodium chloride with increasing "fractions of a package" of stabilizer consisting (in total) of 1000 parts per million of 2-mercaptobenzothiazole and 1.67% methyl alcohol. As indicated, there was no loss in the effectiveness occurring when the full package amount was reduced to half, but after that, significant further reductions in the stabilizer resulted in losses of performance. In these tests the lowest effective concentration was about 500 ppm 2-MBT, 8300 ppm methanol and about 100 ppm sodium dithionate. Similar tests of the effect of alcohol concentration have indicated a nearly equal performance for methanol concentrations between about 2100 to 8300 ppm, with 500 ppm 2-MBT.

The total amount of oxygen which can contact an aqueous polymer solution is a critical factor regarding the rate and extent of the degradation of solution viscosity. When a particular kind and amount of inhibitor causes a particular polymer to remain stable through a given period, it is apparent that the inhibitor package is sufficient for controlling degradation for that amount of oxygen. Viscosity debilitation tests are commonly performed by heat-sealing polymer solutions within glass containers, such as 20 cc Wheaton glass ampules. When such ampules are filled with liquid, with minimum space being allowed for the heat-sealing operation, about a 5 cc air space remains. In view of this, a new technique and apparatus has been developed for ensuring that less air is allowed to contact the polymer.

Figure 2:
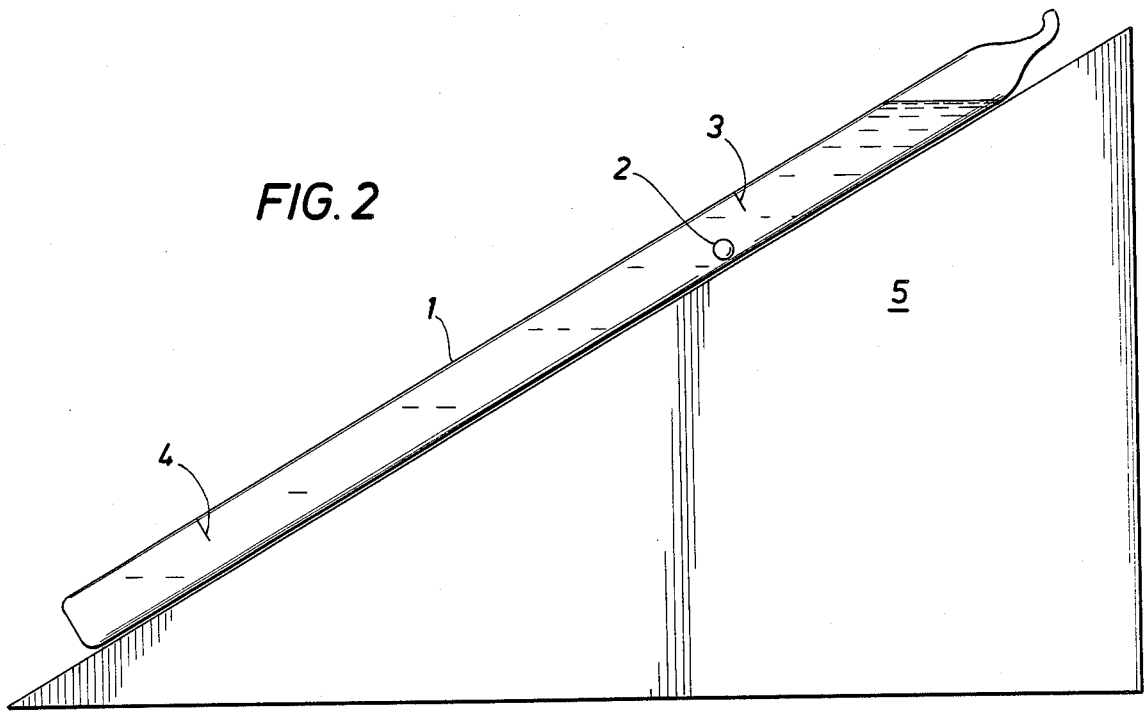
FIG. 2 is a schematic illustration of an improved apparatus for measuring variations with time in the viscosity of a liquid.

FIG. 2 is a schematic illustration of the present tubular viscosity monitoring apparatus. The liquid to be tested is placed in tube 1, and heat-sealed under a vacuum. When such a tube is sealed with the air space under a vacuum, the difference in the air space volume relative to that in a non-vacuum-sealed glass ampule is such that about 20 times fewer oxygen molecules are present in the space within the vacuum-sealed tube. The tube 1 is provided with a small Teflon ball 2. A pair of timing marks 3 and 4 are provided for indicating when the ball has traveled a given distance within the liquid. A guide for maintaining the liquid-containing tube in a given vertical alignment is provided by inclined plane 5 which supports the tube at a suitable angle, about 30 degrees from horizontal.

In a preferred procedure a fall-time (or roll-down time) measured for a freshly prepared polymer solution is compared with that for the same solution after storage. While not identical, such fall time ratios are roughly equivalent to solution viscosity ratios. Where greater accuracy is desired, calibration curves can be made from polymer solutions of differing viscosities, with such a curve preferably being measured for each particular type of polymer. These viscosity testers allow long-term evaluations of the effectiveness of polymer degradation inhibitors at various temperatures.

For the long-term tests, the polymer solutions were stored without artificially high concentrations of free radicals. The data from the long-term tests differ from those of the short-term screening tests. In the long-term tests, little difference was apparent for the 2-MBT system with or without the added methanol. The data in Table II are illustrative of this point. The viscosity ratios shown are considered to be within experimental error.

TABLE II

LONG-TERM TEST OF CHEMICALS TO PROVIDE
VISCOUS STABILITY OF POLYMER SOLUTIONS

All samples contained: 2,500 ppm Cyanatrol 950 Polyacrylamide
500 ppm 2-MBT
100 ppm Sodium Dithionate
(Oxygen Scavenger)
10,000 ppm Sodium Hydroxide
Storage Time: 1178 days
Storage Temperature: 74° C.

| Concentration of Methyl Alcohol (ppm) | Viscosity Ratio After 1178 Days (cp) |
| --- | --- |
| 0 | .75 |
| 2100 | .73 |
| 4200 | .68 |
| 8300 | .80 |

The explanation for this result lies in the role the alcohol plays in the thermal-oxidative degradation process. Unlike 2-MBT, which functions as a true oxidation inhibitor by deactivating free radicals, an alcohol deactivates free radicals, but in the process becomes a free radical itself. Consequently, while 2-MBT stops the chain of free radical reactions that lead to polymer degradation, an alcohol can only modify that chain. Because of that characteristic, alcohols are called "chain transfer agents."

In the accelerated test, 500 ppm of 2-MBT provides about as many inhibitor molecules as there are free radicals. That is not enough 2-MBT to prevent many of the free radicals from finding polymer molecules to attack. However, if many molecules of alcohol are present (2000 ppm of methyl alcohol provides about 20 times as many alcohol molecules as there are free radicals in the accelerated test), chances favor free radical deactivation by alcohol before the free radicals can attack polymer. Of course, the alcohol is then a free radical, but it is not as reactive as the original free radical, and it too can be deactivated by another alcohol molecule which becomes a free radical. Ultimately, this chain of alcohol free radicals is stopped by 2-MBT.

But in the long-term storage tests, in which the concentration of free radicals is not artificially high, alcohol is not needed. Five hundred ppm of 2-MBT is enough to deactivate the low concentration of naturally-occurring free radicals before they can attack polymer. If an alcohol molecule is there to enter into a chain transfer reaction, it does no harm, but neither does it do any good. Consequently, inclusion of an alcohol in the inhibitor package appears unnecessary for actual field use.

Figure 3:
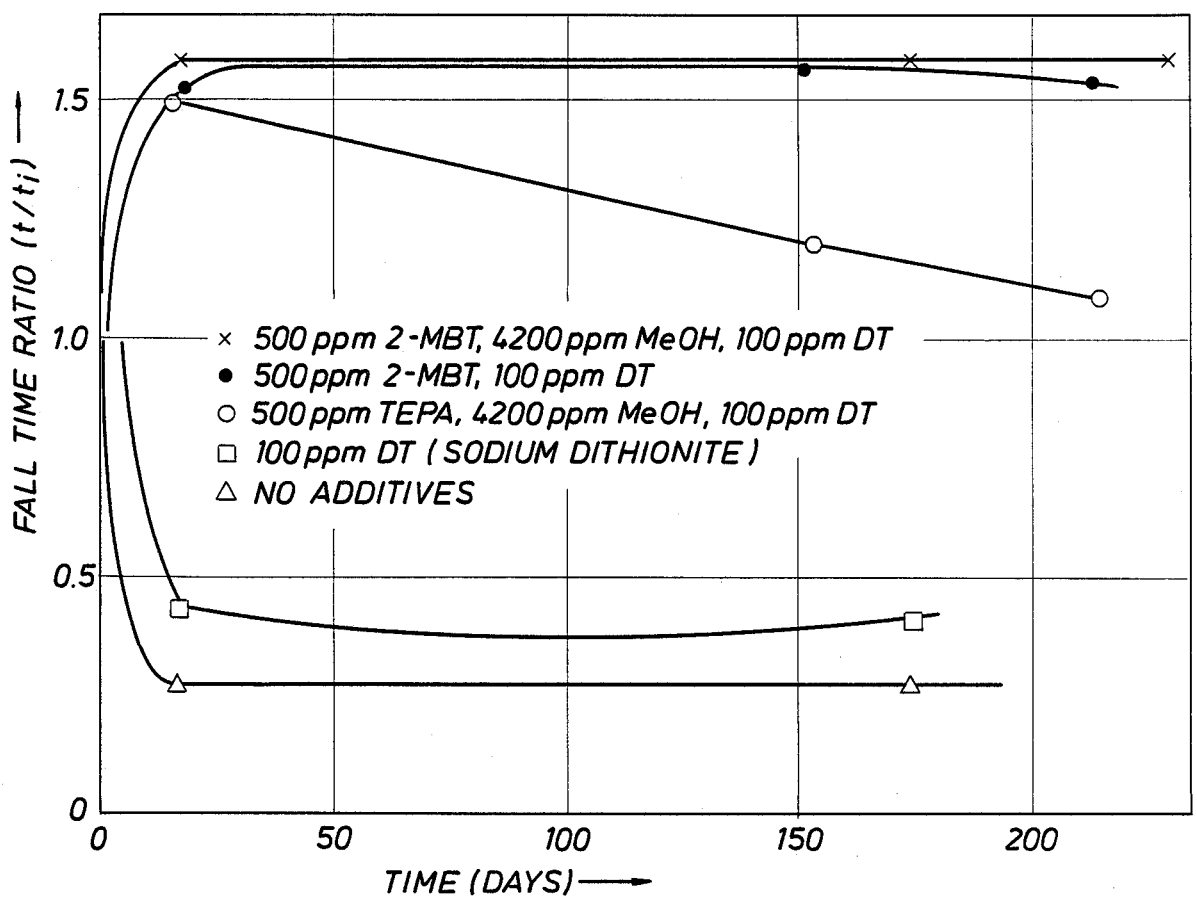
FIGS. 3 and 5 are plots of variations with time of viscosities of various aqueous alkaline polymer solutions.
Figure 4:
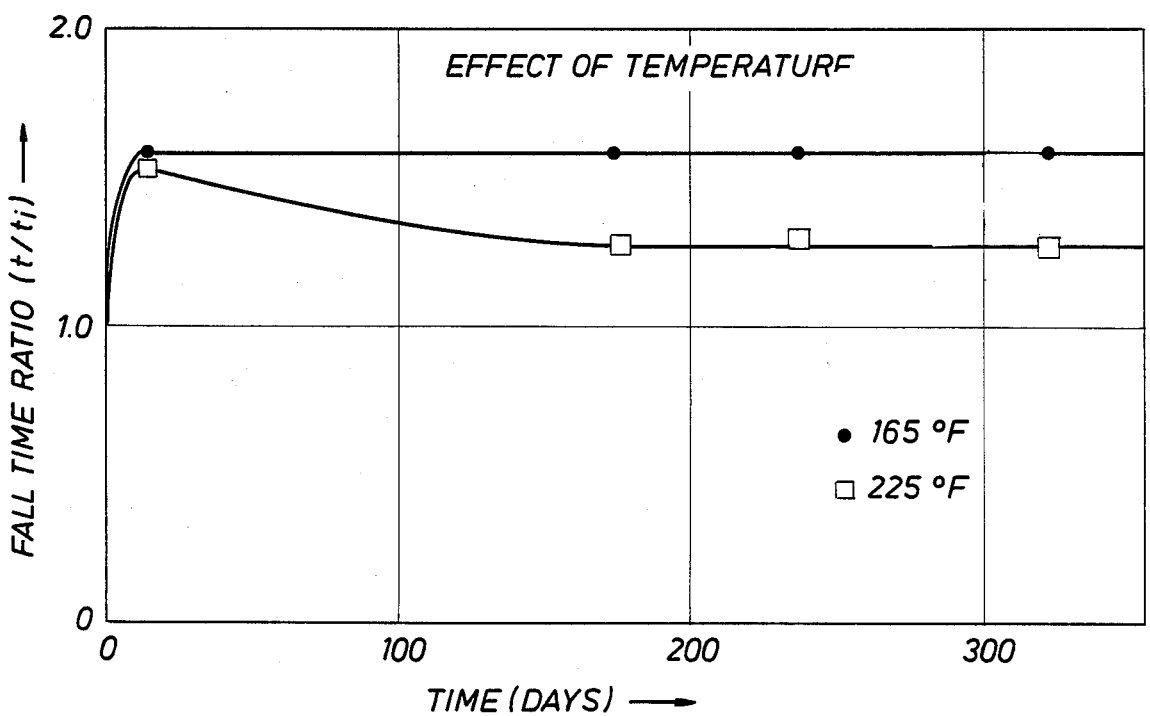
FIG. 4 is a plot of variations with time of the viscosities of aqueous alkaline polymer solutions at different temperatures.
Figure 5:
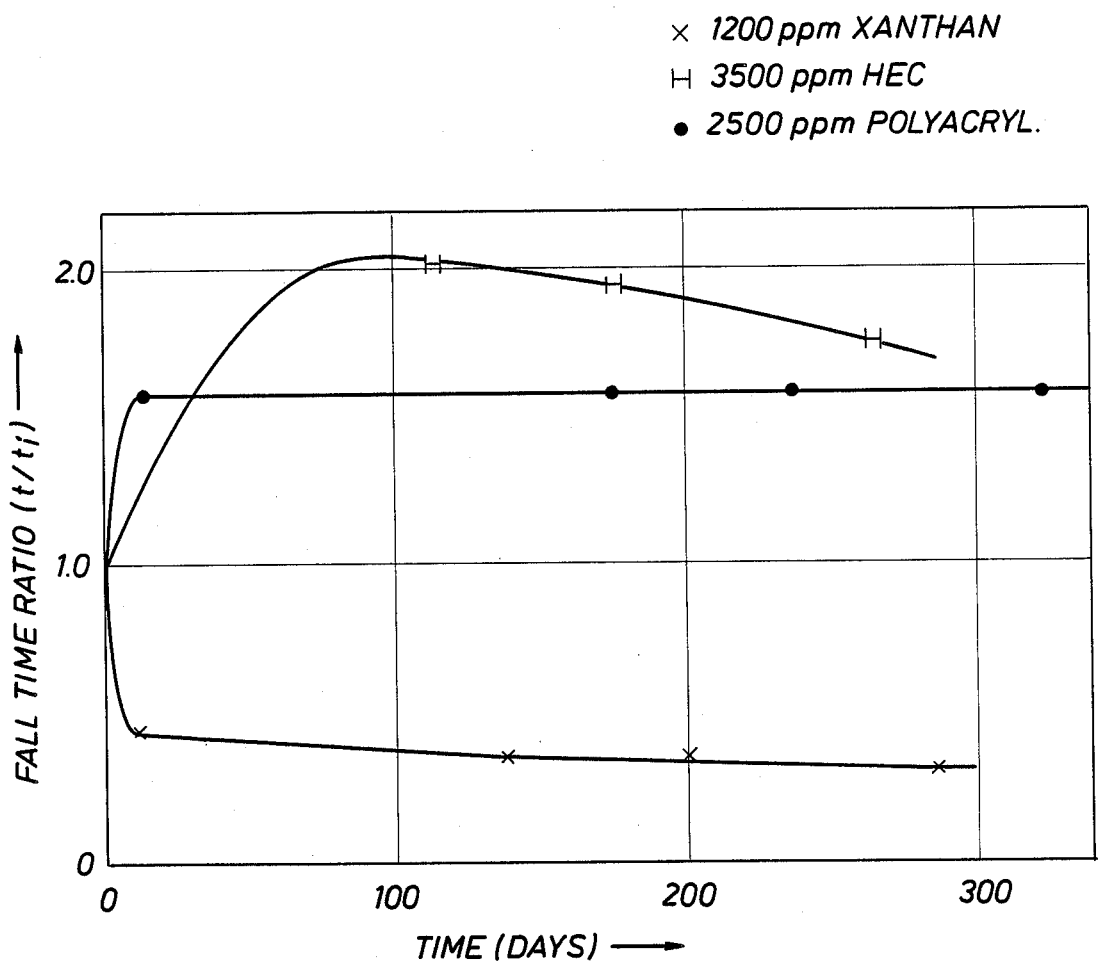

FIGS. 3 through 5 illustrate the results of long-term evaluations of the effectiveness of polymer degradation inhibitors.

FIG. 3 shows variations of polymer solution viscosity with time for the specified series of solutions. Each of the specified solutions also contained 2500 ppm polyacrylamides, 1% sodium hydroxide, and 1.5% sodium chloride. The solutions were maintained at 74° C. and the viscosities were measured by fall time ratios. The two solutions including 2-MBT as a stabilizer show little or no viscosity degradation over the life of the experiment.

FIG. 4 shows a plot of variations of solution viscosity with time for the aqueous alkaline polymer solutions stored at 165° F. and 225° F. In each case, the solutions contained 2500 ppm of the Cynatrol 950 polyacrylamide polymer available from American Cyanamid Company, 1% sodium hydroxide, 1.5% sodium chloride, 500 ppm of 2-MBT, 2100 ppm methyl alcohol and 100 ppm sodium dithionite. The viscous stability was less at the higher temperature, but the results provided by the 2-MBT stabilizer were excellent. The viscosity for the solution containing that stabilizer remained higher than the original solution after nearly one year of storage at 225° F.

FIG. 5 shows plots of viscosities with time for, respectively, a xanthan gum polymer, a hydroxyethyl cellulose, and a polyacrylamide polymer in solutions stabilized in accordance with the present invention. In addition to the indicated kinds and amounts of polymers, each of the solutions contained 1% sodium hydroxide, 1.5% sodium chloride, 500 ppm 2-mercaptobenzothiazole, 2100 ppm methyl alcohol and 100 ppm sodium dithionite. Each of the solutions had a pH of about 13 and was maintained for the indicated time at 165° F. Although the 2-MBT stabilizer is effective for the hydroxyethyl cellulose and polyacrylamide polymer solutions, it appears to be ineffective for the xanthan gum polymer solution.

Various modifications of the invention described will become apparent to those skilled in the art from the foregoing description, and such modifications are intended to fall within the scope of the subject invention.

What is claimed is:

1. In an oil recovery process in which oil is displaced within a subterranean reservoir by injecting an aqueous alkaline solution which is substantially free of dissolved oxygen, has a pH above about 10, is thickened with a partially hydrolyzed polyacrylamide polymer which has molecular weight exceeding about 5 million and, at least soon after entering the reservoir, contains significantly more than about 50 mole percent of acrylate groups, an improved procedure for maintaining the solution viscosity which comprises:

including within said aqueous alkaline solution effective amounts of each of a water-soluble, sulfur-containing oxygen scavenger, and a 2-mercaptobenzothiazole of the formula:

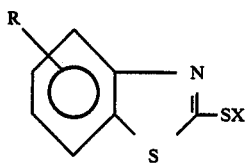

where R represents one or more hydrogen atoms or lower hydrocarbon radicals and X represents a hydrogen atom or other monovalent cation.

2. The process of claim 1 in which X is hydrogen and at least one R is alkyl and the molecular configuration of said thiazole provides properties of water-solubility and oxygen-reactivity at least substantially equalling those of 2-mercaptobenzothiazole.

3. The process of claim 1 in which a readily oxidizable alcohol or glycol is present in the solution to be injected.

4. The process of claim 1 in which about 100–500 ppm oxygen scavenger is present in the solution to be injected.

5. The process of claim 4 in which the oxygen scavenger is an alkali metal dithionite.

6. The process of claim 3 in which said alcohol or glycol comprises methyl alcohol.

7. The process of claim 1 in which said thiazole is 2-mercaptobenzothiazole.

8. A process for recovering oil from a subterranean reservoir penetrated by spaced injection and productions wells comprising:

injecting into the reservoir a thickened, aqueous alkaline solution comprising:

(1) an aqueous alkaline solution with a pH above about 10, with water having a hardness compatible with the alkalinity of the solution;

(2) a water soluble, sulfur containing oxygen scavenger;

(3) a partially hydrolyzed polyacrylamide polymer which has a molecular weight exceeding about 5 million, and which, at least soon after entering the reservoir, hydrolyzes such that more than 50 mole percent of the acrylamide groups are converted to acrylate groups; and (4) a 2-mercaptobenzothiazole of the formula:

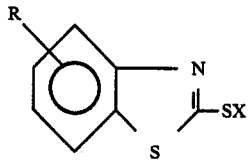

wherein R represents one or more hydrogen atoms or lower hydrocarbon radicals and X rep-
resents a hydrogen atom or other monovalent cation;

displacing the solution within the reservoir; and
recovering oil displaced by the displaced solution.

9. The process of claim 8 in which X is hydrogen and at least one R is alkyl and the molecular configuration of said thiazole provides properties of water-solubility and oxygen-reactivity at least substantially equalling those of 2-mercaptobenzothiazole.

10. The process of claim 8 in which about 100–500 ppm oxygen scavenger is present in the solution to be injected.

11. The process of claim 8 in which the oxygen scavenger is an alkali metal dithionite.

12. The process of claim 8 in which said thiazole is 2-mercaptobenzothiazole.

13. A process for recovering oil from a subterranean reservoir penetrated by spaced injection and productions wells comprising:

injecting into the reservoir a thickened, aqueous alkaline solution comprising:

(1) an aqueous alkaline solution with a pH above about 10, with water having a hardness compatible with the alkalinity of the solution;

(2) a water soluble, sulfur containing oxygen scavenger;

(3) a partially hydrolyzed polyacrylamide copolymer which has a molecular weight exceeding about 5 million, and which, at least soon after injecting into the reservoir become polymers containing more than 50 mole percent carboxyl or acrylate groups; and (4) a 2-mercaptobenzothiazole of the formula:

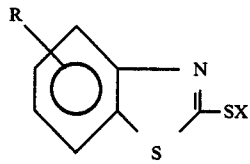

wherein R represents one or more hydrogen atoms or lower hydrocarbon radicals and X represents a hydrogen atom or other monovalent cation;

displacing the solution within the reservoir; and
recovering oil displaced by the displaced solution.

14. The process of claim 13 in which X is hydrogen and at least one R is alkyl and the molecular configuration of said thiazole provides properties of water-solubility and oxygen-reactivity at least substantially equalling those of 2-mercaptobenzothiazole.

15. The process of claim 13 in which about 100–500 ppm oxygen scavenger is present in the solution to be injected.

16. The process of claim 13 in which the oxygen scavenger is an alkali metal dithionite.

17. The process of claim 13 in which said thiazole is 2-mercaptobenzothiazole.

* * * * *